(12) United States Patent
Chumerin

(10) Patent No.: US 11,836,933 B2
(45) Date of Patent: Dec. 5, 2023

(54) METHOD FOR CALCULATING INFORMATION RELATIVE TO A RELATIVE SPEED BETWEEN AN OBJECT AND A CAMERA

(71) Applicant: TOYOTA MOTOR EUROPE, Brussels (BE)

(72) Inventor: Nikolay Chumerin, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 41 days.

(21) Appl. No.: 17/627,281

(22) PCT Filed: Jul. 18, 2019

(86) PCT No.: PCT/EP2019/069423
§ 371 (c)(1),
(2) Date: Jan. 14, 2022

(87) PCT Pub. No.: WO2021/008712
PCT Pub. Date: Jan. 21, 2021

(65) Prior Publication Data
US 2022/0262017 A1    Aug. 18, 2022

(51) Int. Cl.
*G06T 7/246* (2017.01)
*G06T 7/215* (2017.01)
(Continued)

(52) U.S. Cl.
CPC ............ *G06T 7/246* (2017.01); *G06T 7/215* (2017.01); *G06T 7/285* (2017.01); *G06T 7/292* (2017.01); *G06V 20/58* (2022.01)

(58) Field of Classification Search
CPC ......... G06T 7/246; G06T 7/215; G06T 7/285; G06T 7/292; G06T 7/579;
(Continued)

(56) References Cited

U.S. PATENT DOCUMENTS

| 6,731,777 B1 * | 5/2004 | Nishigaki ............... G06V 20/64 |
| | | 382/104 |
| 6,963,657 B1 * | 11/2005 | Nishigaki ............... G01S 11/12 |
| | | 382/104 |

(Continued)

FOREIGN PATENT DOCUMENTS

| EP | 3605015 A1 * | 2/2020 | ............... G01C 3/06 |
| WO | 2013158741 A1 | 10/2013 | |

(Continued)

OTHER PUBLICATIONS

International Search Report and Written Opinion dated Jan. 21, 2021 in related International Application No. PCT/EP2019/069423.

*Primary Examiner* — Charles T Shedrick
(74) *Attorney, Agent, or Firm* — Dinsmore & Shohl LLP

(57) ABSTRACT

A method includes calculating a stereo-disparity map between the initial image and the final image, for each column of the stereo-disparity map, calculating an average value of the stereo-disparities of the pixels of the column, calculating the slope and/or constant factor of a linear function approximating variations of said average values; and calculating said information relative to the relative speed between the object and the camera, based on the slope and/or the constant factor.

6 Claims, 3 Drawing Sheets

(51) Int. Cl.
*G06T 7/292* (2017.01)
*G06T 7/285* (2017.01)
*G06V 20/58* (2022.01)

(58) Field of Classification Search
CPC    G06T 2207/10016; G06T 2207/30261; G06V 20/58; G06V 2201/08; G06F 18/2415
See application file for complete search history.

(56) References Cited

U.S. PATENT DOCUMENTS

| | | | | |
|---|---|---|---|---|
| 2002/0154217 | A1* | 10/2002 | Ikeda | G08G 1/167 348/148 |
| 2003/0007074 | A1* | 1/2003 | Nagaoka | H04N 7/18 348/148 |
| 2003/0083790 | A1* | 5/2003 | Hattori | G06V 20/182 701/1 |
| 2003/0091228 | A1* | 5/2003 | Nagaoka | G06V 20/58 382/104 |
| 2003/0141762 | A1* | 7/2003 | Sartori | G06T 7/20 307/10.1 |
| 2004/0016870 | A1* | 1/2004 | Pawlicki | B60W 10/04 315/77 |
| 2005/0033516 | A1* | 2/2005 | Kawasaki | G01C 21/26 340/436 |
| 2005/0195383 | A1* | 9/2005 | Breed | B60N 2/0232 356/28 |
| 2005/0225744 | A1* | 10/2005 | Samukawa | G08G 1/165 356/28 |
| 2005/0231339 | A1* | 10/2005 | Kudo | G06V 20/58 348/148 |
| 2007/0127778 | A1* | 6/2007 | Fujimoto | G06V 20/588 382/104 |
| 2007/0286475 | A1* | 12/2007 | Sekiguchi | G06V 40/103 382/154 |
| 2008/0089557 | A1* | 4/2008 | Iwaki | G01C 3/06 382/106 |
| 2009/0143986 | A1* | 6/2009 | Stein | G06V 20/58 340/436 |
| 2009/0244263 | A1* | 10/2009 | Saito | G06T 7/593 348/47 |
| 2010/0215254 | A1* | 8/2010 | Prokhorov | G06V 20/58 340/995.28 |
| 2010/0295940 | A1* | 11/2010 | Schwarte | G01B 11/026 348/135 |
| 2011/0137527 | A1* | 6/2011 | Simon | G06V 20/64 701/1 |
| 2012/0026329 | A1* | 2/2012 | Vorobiev | G01C 21/12 348/148 |
| 2013/0182896 | A1* | 7/2013 | Azuma | G06V 20/58 382/103 |
| 2013/0236107 | A1* | 9/2013 | Fukaya | G06T 7/246 382/201 |
| 2015/0015384 | A1 | 1/2015 | Shima et al. | |
| 2018/0134285 | A1 | 5/2018 | Cho et al. | |
| 2022/0027642 | A1* | 1/2022 | Shambik | G05D 1/0246 |
| 2023/0083156 | A1* | 3/2023 | Yamazaki | G06V 40/10 |
| 2023/0104858 | A1* | 4/2023 | Itsukaichi | G08G 1/01 345/629 |
| 2023/0119357 | A1* | 4/2023 | Wang | G01V 1/282 702/2 |

FOREIGN PATENT DOCUMENTS

| | | | | |
|---|---|---|---|---|
| WO | WO-2014050288 A1 | * | 4/2014 | G01B 11/14 |
| WO | WO-2014077170 A1 | * | 5/2014 | B60Q 9/008 |

* cited by examiner

METHOD FOR CALCULATING INFORMATION RELATIVE TO A RELATIVE SPEED BETWEEN AN OBJECT AND A CAMERA

CROSS-REFERENCE TO RELATED APPLICATIONS

This application is a National Stage of International Application PCT/EP2019/069423 filed on Jul. 18, 2019, and entitled "METHOD FOR CALCULATING INFORMATION RELATIVE TO A RELATIVE SPEED BETWEEN AN OBJECT AND A CAMERA," the entire contents of which are hereby incorporated by reference.

TECHNICAL FIELD

The present disclosure is directed to a method for calculating information relative to a relative speed between an object and a camera, in particular a camera mounted in a vehicle, a control method for the vehicle, a computer program, a computer-readable recording medium, and an automated driving system.

BACKGROUND ART

When a vehicle is moving, detecting the independently moving objects (IMO) moving around the vehicle is of utmost importance for safely driving the vehicle. Estimating the relative speed of these objects relative to the vehicle is also of extreme importance.

This relative speed can oftentimes be determined by radars mounted on the vehicle.

However, in case the moving object is not in the field of acquisition of a radar of the vehicle, or in case a radar has a breakdown, it may be necessary to use an alternative method to gather information on a relative speed between the vehicle and a mobile object moving around the vehicle.

Accordingly, there is a need for a method providing information about a relative speed between an object and a vehicle, in particular when such information cannot be supplied by a radar of the vehicle.

SUMMARY OF THE DISCLOSURE

The present disclosure has been conceived in view of the above problem of the prior art, and a first object of the present disclosure is therefore to propose a method for calculating information relative to a relative speed between an object and a vehicle which does not rely on a radar of the vehicle.

According to the present disclosure, it is proposed a computer-implemented method for calculating information relative to a relative speed between an object and a camera, based on an initial image and a final image of the object, derived from image frames outputted by the camera, said initial image and final image having the same pixel-size; the method comprising:

S41) calculating a stereo-disparity map between the initial image of the object and the final image of the object;

S42) for each column of the stereo-disparity map, calculating an average value of the stereo-disparities of pixels of the column;

S43) calculating a slope and/or a constant factor of a linear function approximating variations of said average values; and S44) calculating the information relative to the relative speed between the object and the camera, based on the slope and/or the constant factor.

The proposed method uses images acquired by a camera to calculate information relative to the relative speed between an object and the vehicle. Such information can for instance be a relative velocity in depth RVD of the object relative to the vehicle, or the time to collision TtC with the object.

In the above definition, the initial image and final image of the object are derived from image frames outputted by the camera. This means that these initial and final images are obtained based on image frames outputted by the camera, by applying a preprocessing to these frames. The preprocessing can include any image processing, such a contrast enhancing, etc.; in addition, as explained below, it normally includes a routine to extract sub-images corresponding to objects identified in the frames.

Most of the times, the object does not have the same size in the image frames of the camera from which the initial image and the final image are derived and consequently, the sizes of the initial image and the final image are different from each other. In this case, the largest of these two images is cropped to the size of the smallest of the two images.

Advantageously, the proposed method uses a cheap sensor, which is present in most modern vehicles.

Based on the images acquired by the camera, the method makes it possible to obtain information relative to the relative speed between the object and the vehicle in only a few calculation steps. In addition, since it is based on many pixels of the image of the object in the image frames acquired by the camera, the proposed method is quite robust and has little sensitivity to noise.

The proposed method further provides a robust solution to estimate the object's visual expansion rate, even for small relative changes in the image plane, and can further be used to estimate the relative velocity in depth of the object and the time-to-collision with the detected object.

Furthermore, the information obtained by the above method can be used to control a vehicle.

Consequently, another purpose the present disclosure is to propose a control method for a vehicle, the vehicle comprising a camera configured to acquire images, the control method comprising the steps of:

S10) acquiring camera images of the environment of the vehicle with the camera;

S20) identifying an object in at least a pair of said camera images;

S30) extracting an initial object image and a final object image which are portions of said pair of camera images defined by a bounding box of said identified object;

S40) calculating information relative to a relative speed between an object and a camera, using the above-proposed method; and S50) controlling at least one vehicle device of the vehicle based on said information relative to the relative speed between the object and the camera.

In a particular implementation, the proposed control method is determined by computer program instructions.

Accordingly, another purpose the present disclosure is to propose a computer program which is stored on a non-transitory computer-readable storage media, and which is suitable for being performed on a processor, the program including instructions adapted to perform the steps of the above-defined method when it is run on the processor.

The computer program may use any programming language, and be in the form of source code, object code, or code intermediate between source code and object code, such as in a partially compiled form, or in any other desirable form.

The processor mentioned above may be any data processing means, for instance a personal computer, an electronic control unit configured to be mounted in a car, etc.

The present disclosure also includes a non-transitory computer-readable medium storing instructions that, when executed by a processor, cause the processor to perform the computer program mentioned above.

The computer-readable medium may be an entity or device capable of storing the program. For example, the computer-readable medium may comprise storage means, such as a read only memory (ROM), e.g. a compact disk (CD) ROM, or a microelectronic circuit ROM, or indeed magnetic recording means, e.g. a floppy disk or a hard disk.

Alternatively, the computer-readable medium may be an integrated circuit in which the program is incorporated, the circuit being adapted to execute or to be used in the execution of the control method in question.

Another object of the present disclosure is to propose an automated driving system for a vehicle, the automated driving system comprising an electronic control unit configured, based on an initial image and a final image of the object, derived from image frames outputted by a camera, said initial image and final image having the same pixel-size:

S41) to calculate a stereo-disparity map between the initial image of the object and the final image of the object;

S42) for each column of the stereo-disparity map, to calculate an average value of the stereo-disparities of pixels of the column;

S43) to calculate a slope and/or a constant factor of a linear function approximating variations of said average values; and S44) to calculate information relative to a relative speed between the object and the camera, based on the slope and/or the constant factor.

In an embodiment, the automated driving system further comprises a camera configured to be mounted on a vehicle; and the electronic control unit is configured to:

S10) acquire camera images of the environment of the vehicle with the camera;

S20) identify an object in at least a pair of said camera images;

S30) extract an initial object image and a final object image which are portions of said pair of camera images defined by a bounding box of said identified object;

S50) output a command for at least one vehicle device of the vehicle based on said information relative to the relative speed between the object and the camera.

The vehicle device can be for instance the brakes of the vehicle, its engine, and/or its steering column, which can therefore be controlled—and least partly—based on the information relative to the relative speed between the object and the vehicle.

BRIEF DESCRIPTION OF THE DRAWINGS

The present disclosure may be better understood and its numerous other objects and advantages will become apparent to those skilled in the art by reference to the accompanying drawing wherein like reference numerals refer to like elements in the several figures and in which.

DETAILED DESCRIPTION

An automated driving system 10 configured to implement the proposed method for controlling a vehicle is now going to be described.

Figure 1:
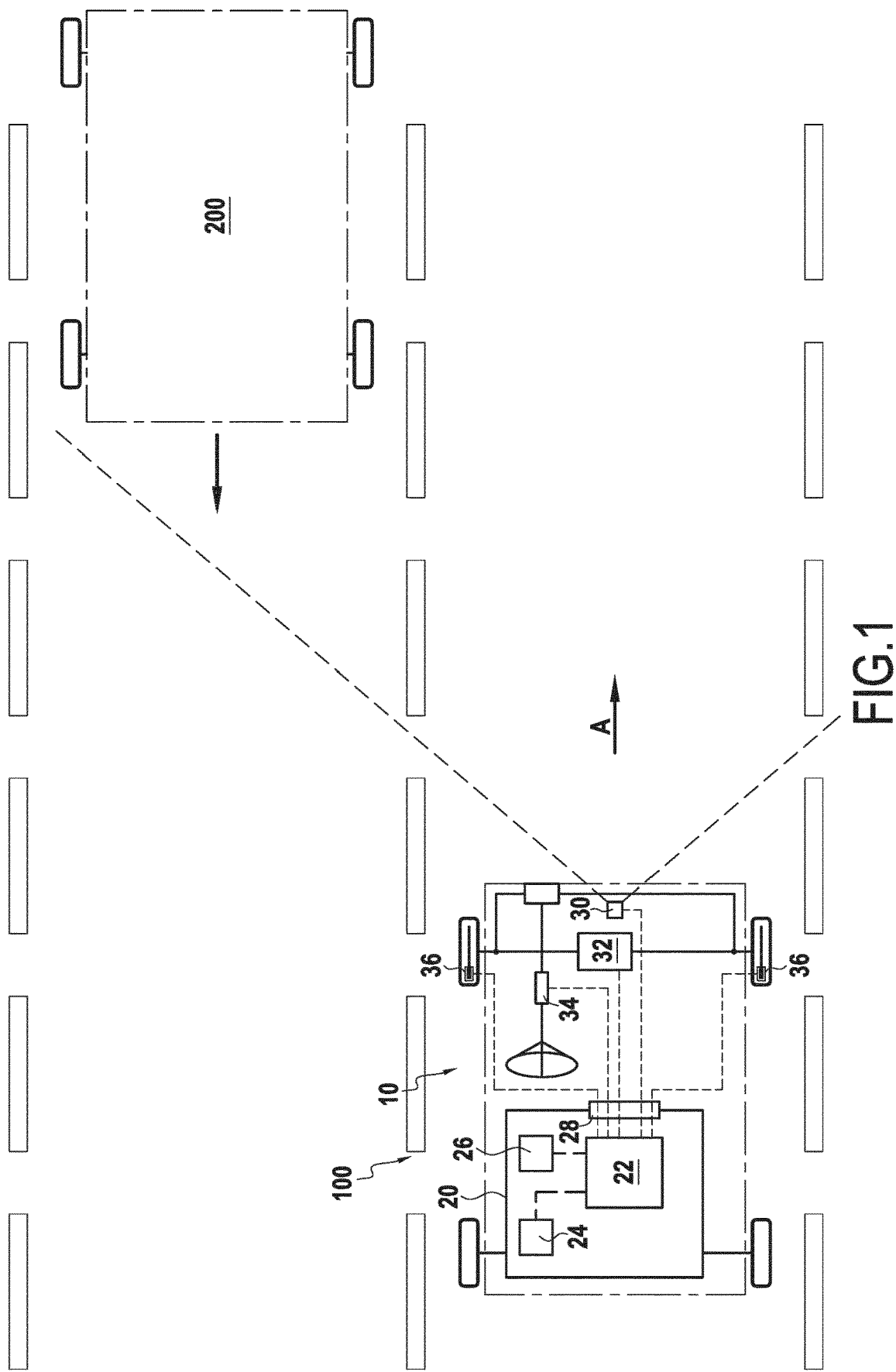
FIG. 1 is a schematic drawing showing essentially of a vehicle equipped with an automated driving system according to the present disclosure.

FIG. 1 schematically represents a vehicle 100 (an example of a host vehicle) equipped with an automated driving system 10 which forms an exemplary embodiment of the present disclosure. Vehicle 100 moves on a road (arrow A); in the opposite direction, another vehicle 200 is coming, in the left lane.

The automated driving system 10 (or, in short, the system 10) is, in the present case, an automated driving system comprising an electronic control unit 20 including a camera 30, as well as several other not represented sensors.

The images produced by camera 30 are transmitted to the electronic control unit 20 (ECU 20).

The ECU 20 has globally the hardware architecture of a computer. The ECU 20 comprises a processor 22, a random access memory (RAM) 24, a read only memory (ROM) 26, an interface 28.

The hardware elements of ECU 20 are optionally shared with other units of the automated driving system 10 and/or other systems of the vehicle 100.

The interface 28 includes in particular a tactile display and various displays mounted in or on the dashboard of the vehicle.

The interface 28 comprises a driver interface with a (not-shown) display to transmit information to the driver of the vehicle 100, and interface connections with actuators and other vehicle devices of the vehicle. In particular, interface 28 comprises a connection with several driving actuators of the vehicle 100, namely, the engine 32, the steering column 34, and the brakes 36.

A computer program configured to partly assume the driving task by performing lateral and longitudinal control of the vehicle is stored in memory 26. This program is configured to calculate information relative to a relative speed between vehicle 100 and the surrounding objects, detected in the images transmitted by camera 30. This program is further configured to output the commands which, at least during some driving periods, control driving actuators of the host vehicle.

This program, and the memory 26, are examples respectively of a computer program and a non-transitory computer-readable medium pursuant to the present disclosure.

The memory 26 of the ECU 20 indeed constitutes a non-transitory computer readable medium according to the present disclosure, readable by the processor 22. It stores instructions which, when executed by a processor, cause the processor 22 to perform the control method according to the present disclosure.

More specifically, the program stored in memory 26 includes instructions for executing a method for controlling the vehicle 100 based on information relative to a relative speed between the vehicle and the 'independently moving objects' (IMO) moving outside the vehicle. In the present embodiment, the vehicle 200 coming in the opposite direction is taken as an example of an IMO outside vehicle 100.

To perform its function, system 10 uses the images provided by camera 30, processes these images in ECU 20, and controls the vehicle 100 on the basis of information relative to a relative speed between the vehicle and the 'independently moving objects' detected around the vehicle, calculated by ECU 20.

Figure 2:
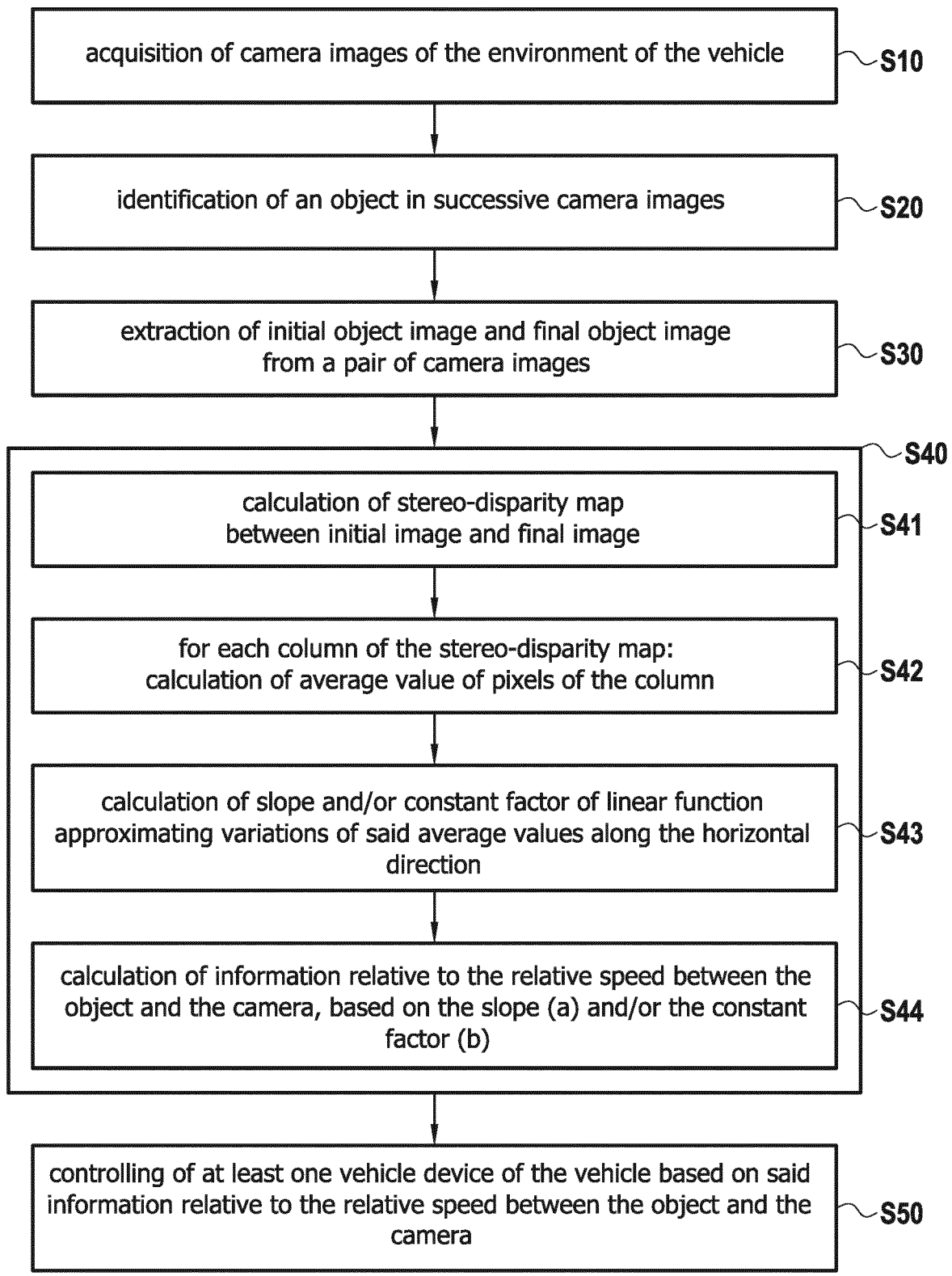
FIG. 2 is a block diagram showing steps of a method for determining information relative to a relative speed between a moving object and the camera of a vehicle according to the present disclosure.

In accordance with the present disclosure, the vehicle 100 can be controlled during driving pursuant to the control method illustrated by FIG. 2.

This method comprises the following steps:

S10) Camera images of the environment of the vehicle are acquired successively by camera 30. In practice, camera 30 continuously monitors the scene in front of vehicle 100, and thus transmits image frame at a rate of 30 frames per second to the electronic control unit 20.

S20) In each of these images, the electronic control unit identifies the objects which are present. In the present embodiment, this identification is made using a neural network and focuses in identifying in particular pedestrians, other vehicles, etc. More generally, the electronic control unit can use any algorithm for identifying the objects which are present around the vehicle, not necessarily neural network(s). In the present example, an upcoming vehicle 200 is identified in successive images transmitted by camera 30.

S30) When an object has been identified in an image, the image of the object (or 'object image') is extracted from the camera image. In this purpose, a bounding box is determined for the object in each of these camera images. The initial object image and the final object image are then cropped out from the camera images so as to be defined by the bounding box of the object. The initial image and the final image must have the same size (expressed in pixels).

For this reason, in case the sizes of the initial image and the final image are different from each other, the largest of these two images is cropped to the size of the smallest of the two images.

Figure 3:
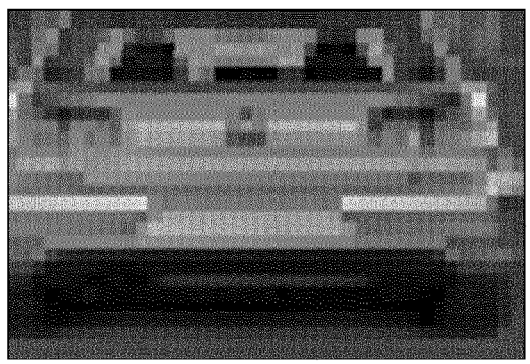
FIG. 3 is a figure showing an initial patch extracted from an initial image acquired by a camera.
Figure 4:
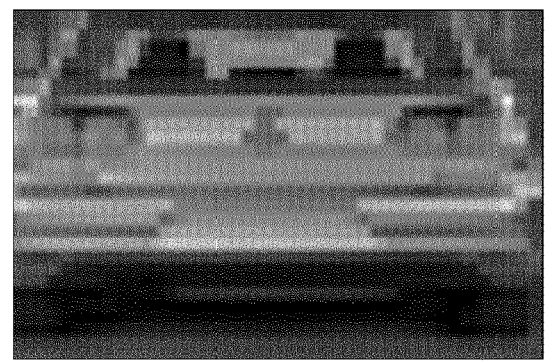
FIG. 4 is a figure showing a final patch extracted from a final image acquired by a camera.

Pursuant to this process, two images I1 and I2 represented on FIGS. 3 and 4 are thus extracted from two successive images of camera 30, and represent an initial object image and a final object image with the meaning of the present disclosure.

S40) Then, information relative to a relative speed between an object and a camera is calculated as follows:

S41) A stereo-disparity map is calculated between the initial image I0 and the final image I1. Any stereo-disparity algorithm can be used, for instance SGM, or phase-based, to obtain the disparity map.

Figure 5:
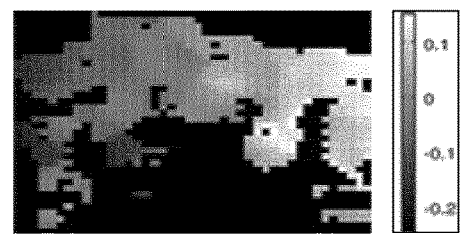
FIG. 5 is a disparity map created based on the initial patch and the final patch of FIGS. 3 and 4.

The disparity map M so obtained is shown on FIG. 5. Pixels for which the stereo-disparity cannot be calculated are shown in black, and are not taken into account for the remainder of the procedure.

Figure 6:
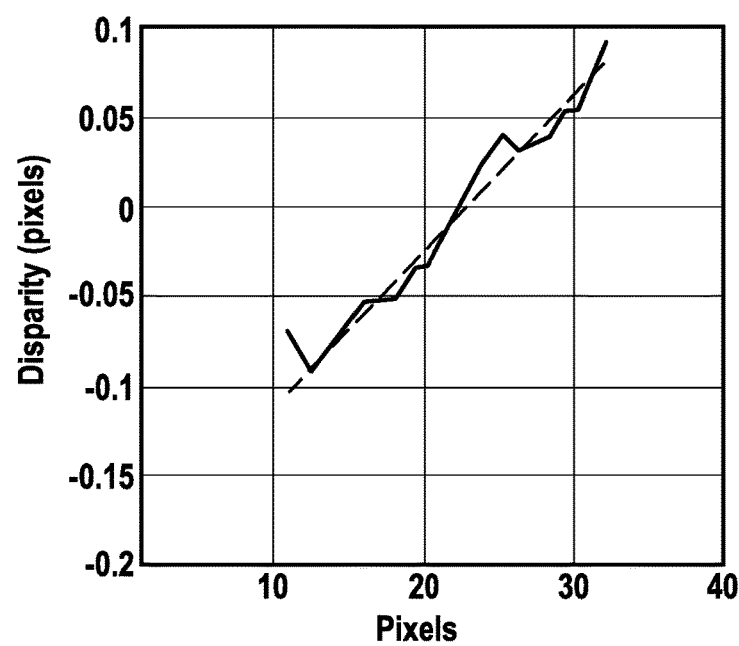
FIG. 6 is a schematic diagram showing a curve that represents the variations of vertically-averaged values of the disparity map of FIG. 5, and the approximation of these variations by a straight line.

S42) Then, for each column of the stereo-disparity map, an average value of pixels of the column is calculated. Various averaging functions can be used to calculate the average value of the column: a first-degree mean, a quadratic mean, a median, etc. This calculation provides a series of average disparity values, each corresponding to a pixel location on the horizontal axis of the initial and final images. These values can be used to draw a curve. Such a curve C is shown on FIG. 6. The abscissa shows the location on the same horizontal axis as the initial and final images I0 and I1. The ordinate represents the average disparity value previously calculated.

S43) Then, this curve C is approximated by a straight line L. In other words, the slope a and the constant b of the line L approximating curve C are determined (the equation of line L is therefore: y=ax+b. The parameters of line L can be calculated by any known method, for instance using a least squares method, a RANSAC method, an IRLS method, etc.

S44) The values of the slope a and/or of the constant b are then used to calculate information relative to a relative speed between the object and the camera. The information can be very simple. For instance, depending on the sign of the slope a, it can be determined whether the detected object is moving away (s<0) or toward (s>0) the vehicle. Such information is information relative to the relative speed between the vehicle and the object and is sometimes sufficient to decide to stop tracking the object (if it moves away), or conversely to increase the level of attention paid to the object, if it gets closer.

In addition, the visual expansion VE can then be calculated: VE=1+a. The visual expansion is a coefficient which characterizes how fast an image of an object grows or conversely shrinks in an image.

As another information which can be possibly extracted from the slope a and the constant b, based on the visual expansion VE and an estimate D (which can be a rough estimate) of the distance from the vehicle 100 to the object, such as the vehicle 200, the relative velocity in depth RVD of the object relative to the vehicle can be calculated using the following formula:

$$RVD=D*(1-VE)/(T1-T0)$$

where T0 and T1 are the instants at which the initial image I0 and the final image I1 were acquired.

As another information which can be possibly extracted from the slope a and the constant b, based on the relative velocity in depth RVD, the time to collision with the object (the vehicle 200) can be estimated using formula below:

$$TtC=D/RVD$$

S50) Finally, the electronic control unit 20 outputs commands to control at least one vehicle device (32, 34, 36) of vehicle 100, based on said information relative to the relative speed between the object and the camera, for instance based on the slope a, the visual expansion VE, the relative velocity in depth RVD of vehicle 200, and/or the time-to-collision TtC with vehicle 200.

The invention claimed is:

1. A computer-implemented method for calculating information relative to a relative speed between an object and a camera, based on an initial image and a final image of the object, derived from image frames outputted by the camera, the initial image and final image having the same pixel-size, the method comprising:
   calculating a stereo-disparity map between the initial image and the final image;

for each column of the stereo-disparity map, calculating an average value of the stereo-disparities of pixels of the column;

calculating a slope and/or a constant factor of a linear function approximating variations of the average values; and calculating the information relative to the relative speed between the object and the camera, based on the slope and/or the constant factor.

2. A non-transitory computer-readable medium storing instructions that, when executed by a processor, cause the processor to perform a computer program including instructions to perform a method according to claim 1.

3. A control method for a vehicle, the vehicle comprising a camera configured to acquire images, the control method comprising:

acquiring camera images of an environment of the vehicle with the camera;

identifying an object in at least a pair of the camera images;

extracting an initial object image and a final object image which are portions of the pair of camera images defined by a bounding box of the identified object;

calculating information relative to a relative speed between an object and the camera, using a method according to claim 1; and controlling at least one vehicle device of the vehicle based on the information relative to the relative speed between the object and the camera.

4. A non-transitory computer-readable medium storing instructions that, when executed by a processor, cause the processor to perform a computer program including instructions to perform a method according to claim 3.

5. An automated driving system for a vehicle, the automated driving system comprising an electronic control unit configured to, based on an initial image and a final image of an object, derived from image frames outputted by a camera, the initial image and final image having the same pixel-size:

calculate a stereo-disparity map between the initial image and the final image;

for each column of the stereo-disparity map, calculate an average value of the stereo-disparities of pixels of the column;

calculate a slope and/or a constant factor of a linear function approximating variations of the average values; and calculate information relative to a relative speed between the object and the camera, based on the slope and/or the constant factor.

6. The automated driving system according to claim 5, further comprising a camera configured to be mounted on a vehicle; and the electronic control unit is configured to:

acquire camera images of an environment of the vehicle with the camera;

identify an object in at least a pair of the camera images;

extract an initial object image and a final object image which are portions of the pair of camera images defined by a bounding box of the identified object; and output a command for at least one vehicle device of the vehicle based on the information relative to the relative speed between the object—and the camera.

* * * * *